Patented Oct. 21, 1947

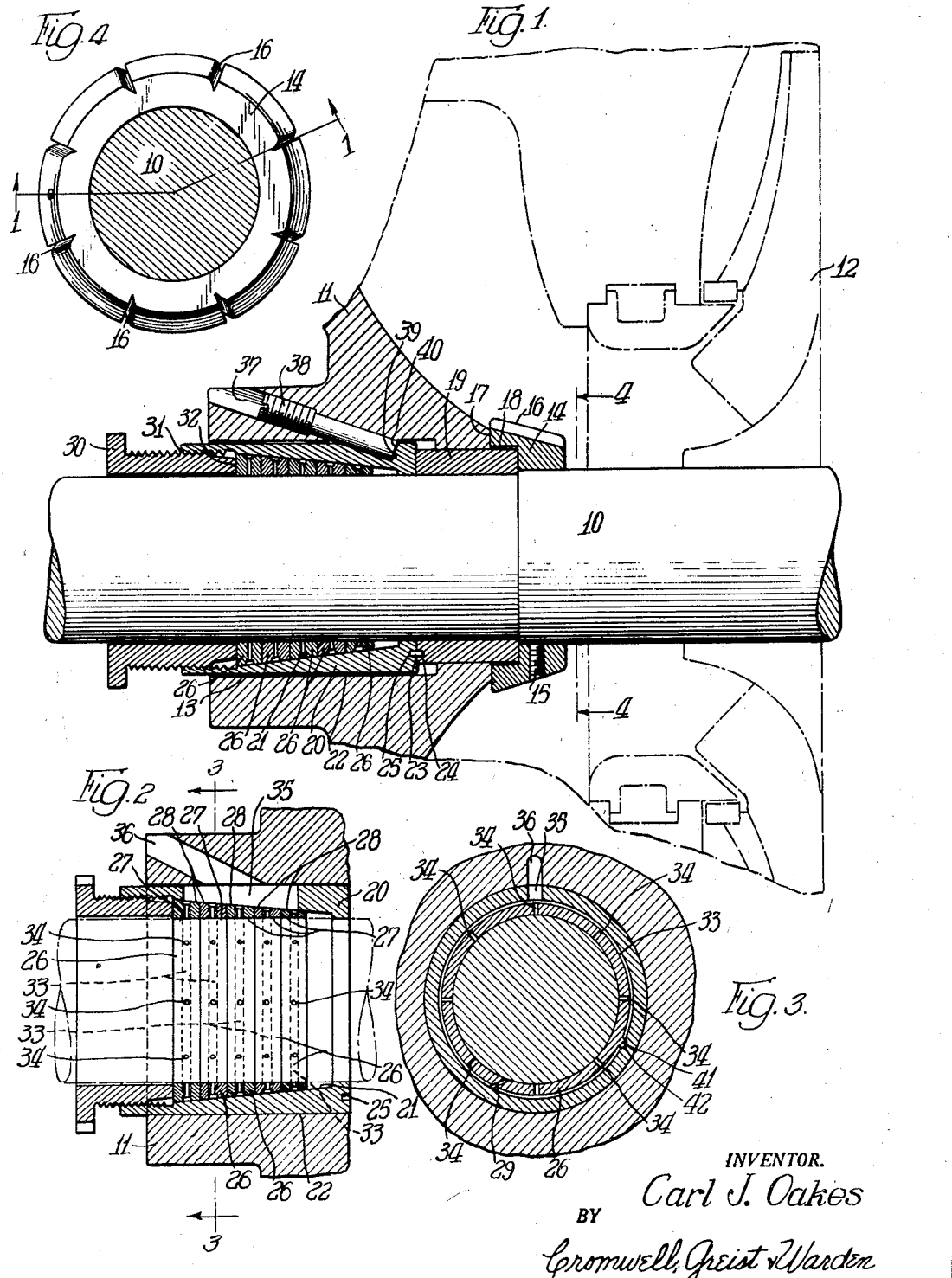

2,429,562

UNITED STATES PATENT OFFICE 2,429,562

STUFFING BOX

Carl J. Oakes, Decatur, Ill.

Application January 5, 1946, Serial No. 639,235

4 Claims. (Cl. 286—7)

My invention is concerned with improvements in a stuffing box adapted to provide a tight joint between a rotatable shaft and a housing or casing which carries the shaft.

It is an object of my invention to provide a stuffing box which is particularly adapted for providing a seal between the housing and the shaft of a centrifugal pump conveying aqueous suspensions of gritty material under high pressure but which may be used wherever a seal between a rotating shaft and its supporting housing is required.

Another object of my invention is to provide a stuffing box comprising tapered packing rings surrounded by an adapter and an adjustable nut which when screwed into the open end of the adapter tightens the packing rings on the shaft.

Another object of my invention is to provide in a stuffing box construction a sealing collar rotatable with a shaft, a stationary sealing ring which fits the shaft and an adjustable screw for forcing the sealing ring into an annular recess cut in the face of the rotating collar to provide an adjustable seal between the collar and the sealing ring.

Another object of my invention is to provide a stuffing box comprising packing rings and an adapter therefor provided with an oil slot for supplying oil to the rings wherein circumferential oil grooves and radial holes are provided in the rings to conduct the oil to the surface of the shaft in contact with the rings.

Another object of my invention is to provide a stuffing box assembly comprising packing rings, an adapter surrounding the rings, a sealing bushing and common means for anchoring the assembly in a stationary housing through which a shaft extends and for adjustably forcing the assembly along the shaft toward a sealing collar on the shaft to take up wear between the sealing ring and the sealing collar.

It is a further object of my invention to provide in a stuffing box construction a sealing collar attached to the rotating shaft and having spaced radially directed longitudinal grooves on the face thereof in combination with a stationary sealing ring surrounding the shaft with one end received in a recess in the sealing collar and means for adjusting the sealing ring longitudinally of the shaft.

It is a further object of my invention to provide a stuffing box construction which insures positive lubrication of the shaft without leakage of oil outside of the box; which eliminates scoring of the shaft due to insufficient lubrication; which is easily maintained without requiring frequent shutdowns for re-packing or repairing and which may be inexpensively manufactured.

These and other objects will be apparent from a description of the preferred embodiment of my invention, which is shown, by way of illustration, in the accompanying drawings, wherein:

Fig. 1 is a generally horizontal section taken on line 1—1 of Fig. 4 showing my stuffing box installed on a centrifugal pump shaft;

Fig. 2 is a vertical section of a part of the structure shown in Fig. 1;

Fig. 3 is a section on the line 3—3 of Fig. 2; and

Fig. 4 is a section on the line 4—4 of Fig. 1.

My invention is illustrated in the drawings, by way of example, as installed on the shaft 10 of a centrifugal pump, a portion of the casing of which is indicated at 11. Portions of the impeller 12 and other pump structure are indicated in dotted line in Fig. 1.

The pump casing or wall 11 is provided with an aperture or bore 13 in which the major portion of the stuffing box is arranged surrounding the shaft 10, which extends through the bore 13 into the pump. The shaft 10 is provided with a sealing collar or throw ring 14 which is secured thereto by a set screw 15 or any other conventional securing means. The sealing collar 14, as shown in Figs. 1 and 4, is provided with a frusto-conical or inwardly tapered outer surface in which there are spaced radially directed recesses 16 which tend to throw the liquid in the pump away from the sealing collar 14 by centrifugal force. The collar 14 is arranged with the outer end in abutting relation with the inner end or surface 17 of the pump casing 11, and a recess 18 is provided in the outer end of the collar 14 for receiving the inner end of a sealing ring or bushing 19 which surrounds the shaft and extends into the bore 13 of the pump casing 11.

A packing ring adapter 20 having a frusto-conical or tapered inner surface 21 and a cylindrical outer surface 22 is positioned in the bore 13 surrounding the shaft 10 outwardly of the bushing 19. A pin 23 seated in holes 24 and 25 in the bushing 19 and the adapter 20 connects the two members in non-rotatable relation. A plurality of packing rings 26 are received within the adapter 20 surrounding the shaft 10. Each of these packing rings 26 is provided with an inner cylindrical surface 27 and an outer tapered or frusto-conical surface 28. The rings 26 are split as shown at 29 in Fig. 3 and the outer frusto-conical surfaces 28 thereof cooperate with the tapered inner surface 21 of the adapter 20 whereby axial movement of the rings within the adapter 20 compresses the rings 26 and moves their inner surfaces 27 toward the surface of the shaft 10. The adapter 20 is provided with an adjusting nut 30 having internal threaded engagement with the outer end of adapter 20 at 31. By screwing up the adjusting nut 30 so that its inner edge 32 applies pressure to the outer one of the rings 26 the rings 26 may be moved inwardly of the adapter 20.

Each of the rings 26 is provided on its outer surface 28 with a circumferential oil groove 33 which is connected by means of radial holes 34 with the inner surface 27 of the ring. The adapter 20 is provided with a longitudinal oil slot 35 and a cooperating communicating slot 36 is provided in the pump casing 11 so that oil may be supplied to the oil grooves 33 in the packing rings 26 and through the holes 34 to the surface of shaft 10.

The pump casing 11 is provided with a threaded aperture 37 and receives therein an adjusting screw 38 the end 39 of which may be projected into the bore 13 and into a recess 40 provided in the adapter 20. Each of the rings 26 is provided with an external bead 41 which cooperates with a groove 42 in the adapter 20 to non-rotatably anchor the rings 26 in the adapter 20. By means of this arrangement the packing assembly which consists of the bushing 19, the packing ring adapter 20 and the packing rings 26 may be non-rotatably anchored in the bore 13 and adjusted inwardly on the shaft 10 to hold the inner end of the bushing 19 in close frictional engagement with the throw ring 14 and take up any wear between these members. The adjusting screw 38 may be arranged at any point around the circumference of the shaft. The longitudinal oil slot 35 should be positioned above the top of the shaft 10 so that it will provide a reservoir for the oil supplied to the packing rings 26.

While various materials may be utilized in the construction of the elements of my stuffing box, I prefer to construct the packing rings 26 of babbitt or lead. In general any metal softer than the shaft may be used for these members. The tapered ring adapter 20 and the adjusting nut 30 therefor may be made of any strong and readily machinable metal. The bushing 19 is preferably constructed of bronze but it may be made of any metal somewhat softer than the collar 14 and the shaft 10 but not so soft as the packing rings 26. The throw ring or collar 14 may be made of the same metal as the rotatable shaft 10.

While my stuffing box is particularly adapted for rotatable shafts of apparatus such as centrifugal pumps, it may also be used in such equipment as steam turbines, propeller shafts of boats, or the like. It will withstand considerable pressure and temperature when used with liquid handling equipment. It is adapted to various types of shafts and has no particular size or rotational speed limitations. When used on centrifugal pump installations it has been found to give more satisfactory service than any other type of stuffing box which has been used. It does not score the pump shaft, it requires only infrequent attention and operates for a relatively long time without re-packing or replacement of the rings. It eliminates the frequent shutdowns of equipment for re-packing which the ordinary stuffing box requires. It is less expensive to maintain and replace.

I claim:

1. A packing construction for providing a seal between two relatively rotatable members, one of said members being provided with an aperture through which the other member extends, packing rings positioned in the aperture in said one member, a sleeve surrounding said packing rings, means to compress said packing rings in said sleeve to move them into close frictional engagement with said other member a bushing coupled to said packing ring sleeve, a collar fixed on said other member and engaging said bushing, and means for anchoring said packing ring sleeve to said apertured member in non-rotatable but axial adjustable relation.

2. A stuffing box construction for providing a seal between a rotatable shaft and an apertured stationary wall through which the shaft extends, comprising a sealing collar attached to the shaft and having one face in engagement with said wall, a bushing on said shaft and having one end in frictional engagement with said sealing collar, a packing ring sleeve surrounding said shaft and in abutting relation with the other end of said bushing, packing rings in said sleeve, means for compressing said rings in said sleeve by moving them in an axial direction therein, an adjusting and anchoring screw in said stationary wall engaging said packing ring sleeve and adapted to move said sleeve in an axial direction, and means non-rotatably connecting said bushing to said sleeve whereby said bushing, said packing ring sleeve and said packing rings may be moved axially as a unit to take up wear between the bushing and the collar.

3. A packing construction for providing a seal between two relatively rotatable members, one of said members being provided with an aperture through which the other member extends, packing rings positioned in the aperture in said one member, said packing rings being provided with circumferential oil grooves and radial connecting passages whereby oil may be supplied between the inner surfaces of said rings and said other member, a sleeve surrounding said packing rings, cooperating means on said packing rings and said sleeve whereby when said packing rings are moved within said sleeve said rings are compressed into close frictional engagement with said other member, an adjustable nut on said sleeve for moving said rings into said sleeve, a bushing coupled to said packing ring sleeve, a collar fixed on said other member and engaging said bushing, and means for anchoring said packing ring sleeve to said apertured member in non-rotatable but axially adjustable relation.

4. A stuffing box construction for providing a seal between a rotatable shaft and an apertured stationary wall through which the shaft extends, comprising a sealing member attached to the shaft and having one face in engagement with said wall, a bushing on said shaft and having one end in frictional engagement with said sealing member, a packing ring sleeve on said shaft and in abutting relation with the other end of said bushing, packing rings in said sleeve, said rings being provided with circumferential oil grooves and connecting radial passages whereby oil may be supplied between proximate surfaces of said packing rings and said rotatable shaft, means for moving said rings in axial direction in said sleeve to compress said ring, an adjusting and anchoring screw in threaded engagement with said stationary wall and extending into engagement with said packing ring sleeve to move said sleeve in an axial direction, and means for non-rotatably securing said bushing to said sleeve whereby said bushing, said packing ring sleeve and said packing rings may be moved axially as a unit to take up wear between the bushing and the sealing member.

CARL J. OAKES.

REFERENCES CITED

The following references are of record in the file of this patent:

UNITED STATES PATENTS

| Number | Name | Date |
|---|---|---|
| 1,307,901 | Farland | June 24, 1919 |
| 1,336,076 | Ellmauer | Apr. 6, 1920 |
| 1,997,613 | Vroom | Apr. 16, 1935 |
| 2,033,796 | Weinschenker | Mar. 10, 1936 |
| 2,046,226 | Weightman et al. | June 30, 1936 |

FOREIGN PATENTS

| Number | Country | Date |
|---|---|---|
| 48,383 | Sweden | 1921 |

Certificate of Correction

Patent No. 2,429,562.

October 21, 1947.

CARL J. OAKES

It is hereby certified that error appears in the printed specification of the above numbered patent requiring correction as follows: Column 4, line 72, claim 4, for the word "ring" read *rings*; and that the said Letters Patent should be read with this correction therein that the same may conform to the record of the case in the Patent Office.

Signed and sealed this 1st day of June, A. D. 1948.

[SEAL]

THOMAS F. MURPHY,
*Assistant Commissioner of Patents.*